United States Patent [19]
Buenzli et al.

[11] Patent Number: 5,138,788
[45] Date of Patent: Aug. 18, 1992

[54] FISHING LINE CASTING ASSIST DEVICE

[75] Inventors: Randal J. Buenzli; Eugene J. Miller, both of McHenry, Ill.

[73] Assignee: Millco Products, Inc., McHenry, Ill.

[21] Appl. No.: 636,306

[22] Filed: Dec. 31, 1990

[51] Int. Cl.$^5$ ............................................. A01K 87/00
[52] U.S. Cl. ........................................................ 43/25
[58] Field of Search ..................................... 43/25, 19

[56] References Cited

U.S. PATENT DOCUMENTS

| | | | |
|---|---|---|---|
| 2,846,804 | 8/1958 | Elliott | 43/25 |
| 3,643,367 | 2/1972 | Denny et al. | 43/25 |
| 4,539,773 | 9/1985 | Eldridge | 43/25 |

FOREIGN PATENT DOCUMENTS 1337114  11/1973  United Kingdom ................... 43/25

*Primary Examiner*—Richard K. Seidel
*Assistant Examiner*—James Miner
*Attorney, Agent, or Firm*—Thomas R. Vigil; James P. Hanrath

[57] ABSTRACT

The fishing line casting assist device comprises a body releasably mountable on the handle of a fishing rod, a rotatable line retaining member rotatably journaled in said body and having a weight coupled thereto for creating a retaining force for maintaining a fishing line trained over said line retaining member until the fishing rod is cast whereupon the casting force causes the retaining member to move to a non-line retaining position where the fishing line is free to flow out of a reel mounted on the fishing rod.

9 Claims, 3 Drawing Sheets

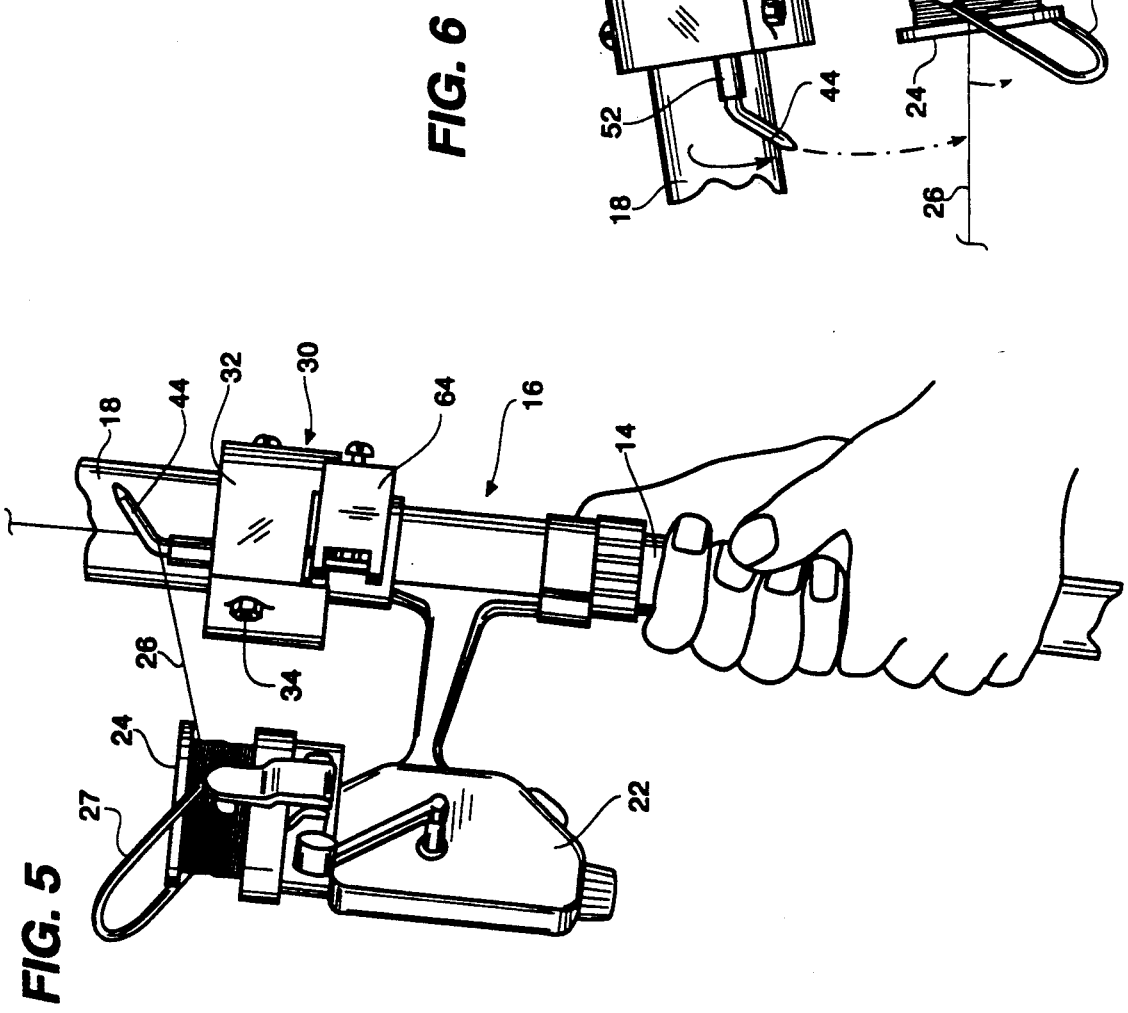

FISHING LINE CASTING ASSIST DEVICE

BACKGROUND OF THE INVENTION

1. Field of the Invention.

The present invention relates to a fishing line casting assist device which includes a rotatable journaled line retaining member, having a weight coupled thereto such that the device can be positioned with the weight creating a retaining force for retaining a fishing line extending from a reel and around the retaining member prior to casting and where the casting of a weighted lure or bait at the distal end of the fishing line forces the retaining member to rotate against the initial restraining force of the weight to a non-line retaining position

2. Description of the related art including information disclosed under 37 CFR Sections 1.97-1.99.

Heretofore, various devices have been proposed for assisting in the holding, releasing and casting of a fishing line. Examples of some of these prior devices are disclosed in the following U.S. Patents:

| U.S. Pat. No. | Patentee |
| --- | --- |
| 2,179,413 | Kolosso, V. J. |
| 2,650,448 | Lichtig, S. H. |
| 2,680,925 | Grunwald, M. F. et al. |
| 2,810,982 | Bucciarelli, N. D. |
| 2,846,804 | Elliot, J. |
| 3,307,287 | Hagen, H. L. |
| 3,309,810 | Hannon, W. F. |
| 4,746,253 | Simmons, B. R |

As disclosed in the Bucciarelli U.S. Pat. No. 2,810,982 and the Elliott U.S. Pat. No. 2,846,804 a common type of prior art fishing line retaining mechanism utilizes a spring mechanism.

As will be described in greater detail below, the casting assist device of the present invention utilizes a journaled rotatable line retaining member having a weight coupled thereto for creating a retaining force for retaining a fishing line until it is cast whereupon the force developed during casting causes the weight and the retaining member to rotate to a non-retaining position at some point in time during the cast where the line is free to flow out of the reel.

SUMMARY OF THE INVENTION

According to the invention, there is provided a fishing line casting assist device comprising a body, means for mounting the body on the handle of a fishing rod having an elongate axis, the body having passage means therethrough generally parallel with the elongate axis, an elongate member journaled in the passage means and having an elongate axis, a distal end and a proximal end, and being rotatable between a first position and a second position without any spring acting on the elongate member, fishing line retaining means at the distal end of the elongate member, and weight means releasably fixed to the proximal end of the elongate member extending radially outwardly from the elongate member and arranged to be rotatably movable with the elongate member between a first fishing line retaining position and a second non-fishing line retaining position corresponding to the first and second rotated positions of the elongate member, the first fishing line retaining position of the weight means being toward the handle and away from a reel mounted to the fishing rod handle, the weight means having sufficient weight so that the force of gravity acting on the weight means alone in it's first position and without manual engagement of the weight means maintains the elongate member in the first rotated position of the elongate member and against any tension in the line due to the weight of a bait or a lure at the distal end of the line.

Stated in another way, according to the present invention there is provided a fishing line casting assist device comprising a body releasably mountable on the handle of a fishing rod, a rotatable line retaining member rotatably journaled in the body, movable between a line retaining position and a non-line retaining position and having a weight coupled thereto, extending radially outwardly therefrom, and having sufficient weight for creating a retaining force for maintaining a fishing line trained over the line retaining member when the weight is positioned toward the handle in the line retaining position where the force of gravity on the weight alone, without manual engagement of the weight and without the application of a spring force on the line retaining member toward or away from the line retaining position, holds the line in the retained position against any tension in the line due to the weight of a bait or a lure at the distal end of the line until the fishing rod is cast whereupon the forces created during casting causes the retaining member to move to the non-line retaining position where the fishing line is free to flow out of a reel mounted on the fishing rod.

BRIEF DESCRIPTION OF THE DRAWINGS

FIG. 5 is a side elevational view of the rod handle, the casting assist device and the spinning reel in a raised position where a fisherman is grasping the lower portion of the rod handle with the spinning reel in the rotated 45 degree position and the rod is lifted past vertical ready for casting.

FIG. 6 is a side elevational view of the rod handle, the casting assist device and the spinning reel after the fisherman has swung the fishing rod forward and the casting force has caused the line retaining member to move away from a retaining position to a rotated non-line retaining position with the weight of the casting device rotated to a lower position.

DESCRIPTION OF THE PREFERRED EMBODIMENT(S)

Figure 1:
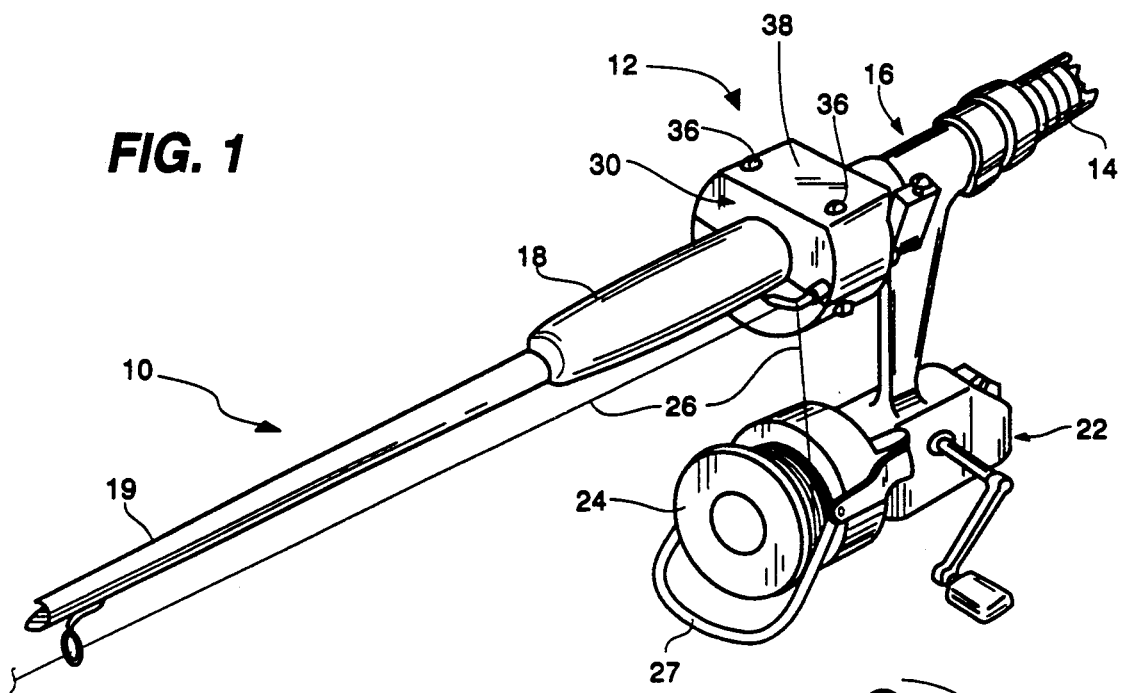
FIG. 1 is a perspective view of a fishing rod handle and part of a fishing rod with portions broken away, and shows an open bale spin casting reel mounted on the fishing rod handle and further shows the casting assist device of the present invention mounted on the handle in front of the mounting of the reel to the handle.

Referring now to FIG. 1 in greater detail there is illustrated therein a portion of a spincasting rod 10 including a handle portion 12 having a butt 14, a reel mounting section 16 and a forward gripping portion 18 and shows a portion 19 of the rod 10 extending from the gripping portion 18 of the handle portion 12.

Mounted on the reel mounting section 16 is an open bale spincasting reel 22 including a spool 24 having a supply of fishing line 26 wound thereon and a bale 27.

Also shown in FIG. 1 is the fishing line casting assist device 30 of the present invention mounted on the gripping portion 18 forward of the reel mounting section 16. The casting assist device 30 includes first and second generally C-shaped body portions 32 and 34 which are configured to be received and clamped about the gripping portion 18 of the handle 18 by fasteners 36. The first or upper body portion 32 has a flat 38 on the upper surface thereof to minimize the extent which the first body portion 32 extends upwardly from the gripping portion 18 thereby to provide a minimum obstruction to a fisherman's hand when it is positioned about the reel mounting section 16.

In accordance with the teachings of the present invention the first body portion 32 has a bore 40 extending therethrough generally parallel to the axis of the spincasting rod 10. Rotatably mounted or journaled in the bore is a pin or rod 42 having a bent or angled distal end portion 44, having a tapered or rounded distal end 46, and a proximal end portion 48 which extends rearwardly from a back side 50 of the first body portion 32.

Figure 2:
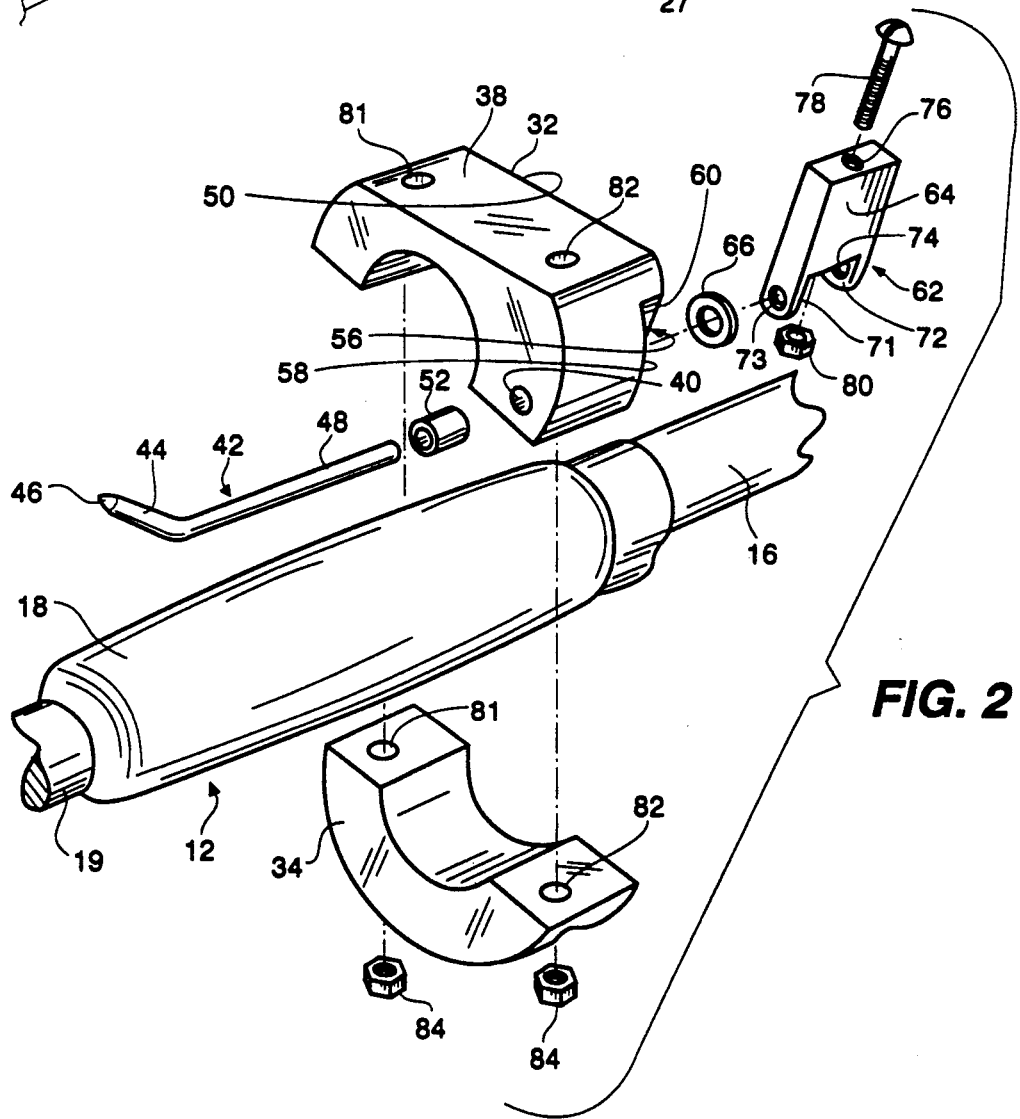
FIG. 2 is an exploded perspective view of the casting assist device of the present invention and a portion of the handled of the fishing rod shown in FIG. 1.
Figure 3:
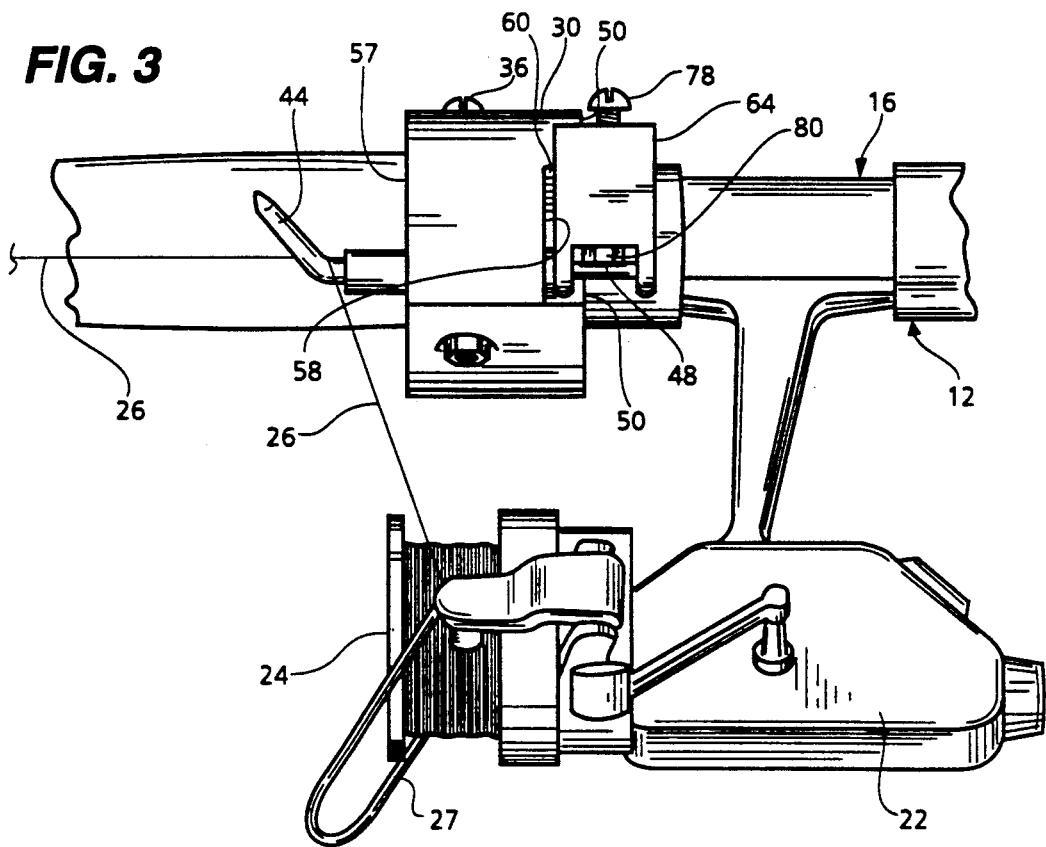
FIG. 3 is a side elevational view of a portion of the rod handle, the casting assist device and the spinning reel with the spinning reel rotated upwardly approximately 45 degrees from a lower zero degree position.

A spacer 52 is positioned on the pin 42 between the bent distal end portion 44 and a front side 54 of the first body portion 32. The first body portion 32 has a cut-away portion 56 extending inwardly from the back side 50 of the first body portion 32 in the area of the throughbore 40 so as to form a shelf 58 with a shoulder 60 (FIGS. 2 and 3). The proximal end portion 42 extends through the cut-away area 56 and has received thereon a bifurcated end portion 62 of a weight 64. A washer 66 is situated between the weight 64 and the shelf 58. The shoulder 60 provides a stop 60 for the weight 64 and limits upward rotatable movement about the elongate axis of the pin 42 and the body portion 34 defining a stop to limit downward movement.

The bifurcated end 62 of the weight 64 has two spaced apart legs 71 and 72 which form the bifurcation of the weight 64 and each leg 71, 72 has a bore 73 or 74 therethrough through which the proximal end portion 48 of the pin 42 is received.

In the illustrated embodiment, the weight 64 has a generally rectangular shape and has a transverse bore 76 therethrough which is normal or 90 degrees to the elongate axis of the bores 73, 74 in the legs 71, 72. A bolt 78 extends through this bore 76 and has a nut 80 on the other end thereof in the space between the legs 71, 72 which is adapted to bare against the pin 42 to hold the weight 64 in a selected position relative to the angular disposition of the bent distal end portion 44.

The body portions 32 and 34 can be made of any material and preferably made of a plastic material. The body portions 32, 34 can be hinged or as shown in FIGS. 1 and 2 can have aligned throughbores 81 and 82 and be clamped about the gripping portion of the handle by two of the fasteners or bolts 36 each engaging one of two nuts 84.

It also will be understood that the body portions 32 and 34 can include another mechanism for urging them about and into gripping engagement with the gripping portion 18 of the handle portion 12 to facilitate easy mounting and dismounting of the casting assist device 30 onto the gripping portion 18 of the handle portion 12.

The weight 64 is mounted on the proximal end portion 48 of the pin 42 such that when the weight 64 is abutting the shoulder 60 the bent distal end portion 44 extends angularly away from the reel 22. The position of the bent distal end portion 44 can lie within a 180 degree arc outwardly of a tangent to an imaginary circle having its center concentric with the axis of the spool 24 and passing through the elongate axis of the pin 42. A preferred position is between 60 and 150 degrees to the tangent of the circle.

In use of the casting assist device 30 the body portions 32, 34 are mounted on the gripping portion 18 of the handle portion 12 radially outwardly from the axis of the spool 24 and with the center portion of pin 42 and the distal end portion 44 of the pin 42 located slightly forwardly of the line 26 extending from spinning reel 22. The line 26 is trained from the reel 22 over the bent distal end portion 44 which forms a line retaining member 44 for retaining the line 26 from flowing off the spool 24 of the reel 22, as shown in FIG. 3.

In order to have the force of gravity acting on the weight 64 to serve as a retaining force for retaining the retaining member/bent distal end portion 44 in a retaining position holding the fishing line 26 thereon, and as shown in the illustrated embodiment, it is preferred that the fisherman hold the handle portion 12 of the rod 10 with the fishing reel 22 rotated at least 45 degrees to the left or clockwise from bottom dead center so that the weight 64 rests against the shoulder 60 in a position where the force of gravity acting on the weight 64 creates a sufficient force for the retaining member/bent distal end portion 44 to retain the fishing line 26 against the weight of the a bait or a lure at the distal end of the line 26.

It is to be understood, of course, that the shoulder 60 can be cut through the first body portion adjacent a tangent of the gripping portion 18 or the reel mounting section 16 so that the weight 64 can rest against the handle portion 12 whereby the reel 22 can be positioned at an angle less than 45 degrees from bottom dead center.

Figure 4:
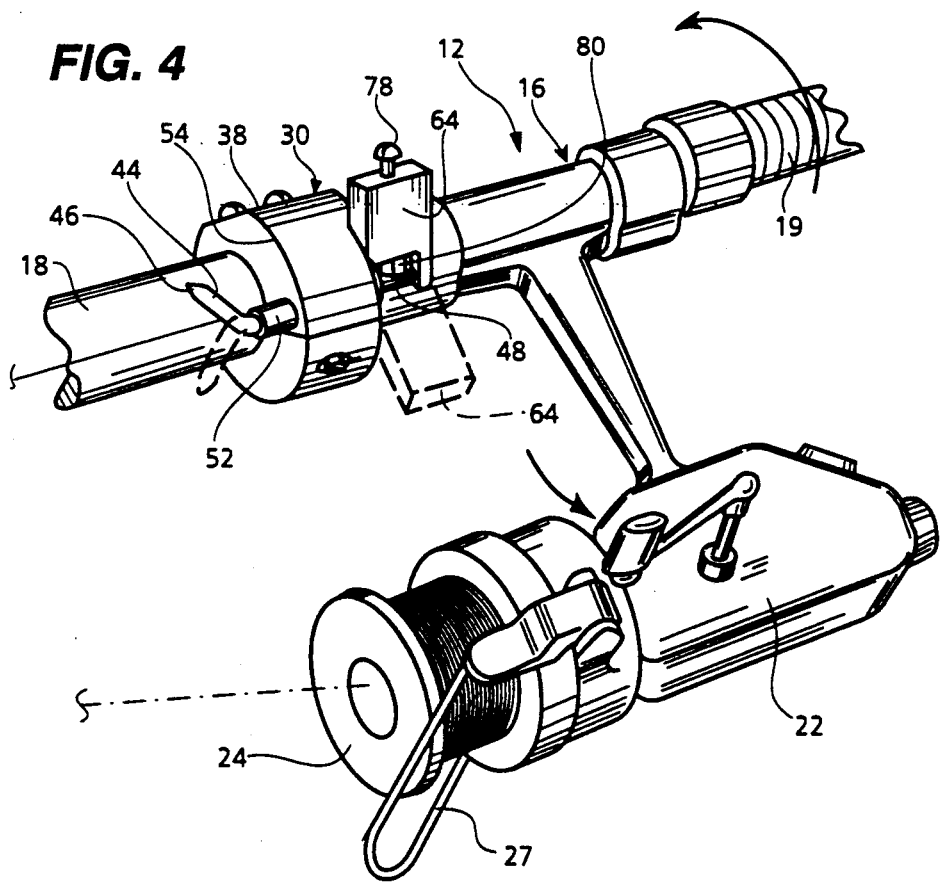
FIG. 4 is a perspective view of the rod handle, the casting assist device and the spinning reel shown in FIG. 3 where a weight of the device is positioned in an upper cocked position and a line-retaining member is holding or retaining the fishing line extending from the spinning reel.

Once the bale 27 has been moved forward as shown and the line 26 is hooked around the retaining member/bent distal end portion 44 with the weight 64 in a position to exert a gravity force that holds the line 26 on the retaining member/bent distal end portion 44, the fisherman can grasp the butt 14 shown in FIG. 4 and raise the rod 10 to the position shown in FIG. 5.

Then the fisherman can swing the rod 10 forward whereupon the casting force causes the line 26 to pull off the bent distal end portion 44, rotating the weight 64 to a lower position where the bent distal end portion 44 is in a non-retaining position relative to the fishing line 26.

Although not known with complete certainty, it is believed that the braking of the forward movement of the swing of the rod, after the swing has established a momentum on the weight, results in the momentum of the weight causing the weight to rotate or move in a forward and downward direction to a non-line retaining position.

It will be noted that the retaining and non-retaining positions of the retaining member/bent distal end portion 44 and the weight 64 are shown in FIG. 4.

It will be understood that the retaining member 44 can take other forms besides a bent distal end portion 44 so long as it is rotatable about the axis of the pin 42. Furthermore, it is to be understood that the weight 64 can take other forms than the weight 64 illustrated in the FIG'S. and can be fixed on the proximal end portion 48 of the pin 42 or adjustable on the proximal end portion 48 of the pin 42 as desired.

From the foregoing description it will be understood that the casting assist device 30 of the present invention has a number of advantages, some of which have been described above and others of which are inherent in the invention. Specifically, the casting assist device 30 enables a fisherman to cast a bait or lure without the need for holding the line with his forefinger while casting. This is particularly advantageous to surf fisherman who like to cast the lure or bait as far as they can by gripping the butt of the handle, with both hands, when casting, thereby to obtain the maximum arc of cast for maximum velocity in casting the bait or lure.

Also, it will be understood that modifications can be made to the casting assist device 30 of the present invention without departing from the teachings of the invention. Accordingly, the scope of the invention is only to be limited as necessitated by the accompanying claims.

I claim:

1. A fishing line casting assist device comprising a body, means for mounting said body on the handle of a fishing rod having an elongate axis, said body having passage means therethrough generally parallel with said elongate axis, an elongate member journaled in said passage means and having an elongate axis, a distal end and a proximal end, and being rotatable between a first position and a second position without any spring acting on said elongate member, fishing line retaining means at said distal end of said elongate member, and weight means releasably fixed to said proximal end of said elongate member extending radially outwardly from said elongate member and arranged to be rotatably movable with said elongate member between a first fishing line retaining position and a second non-fishing line retaining position corresponding to said first and second rotated positions of said elongate member, said first fishing line retaining position of said weight means being toward the handle and away from a reel mounted to the fishing rod handle, said weight means having sufficient weight so that the force of gravity acting on said weight means alone in said first rotated position and without manual engagement of the weight means maintains said elongate member in said first rotated position of said elongate member against any tension in the line due to the weight of a bait or a lure at the distal end of the line.

2. The casting device of claim 1 wherein said fishing line retaining means includes a short rod portion at said distal end of said elongate member and extending radially outwardly from, and angularly forwardly from said elongate axis of said elongate member.

3. The casting assisting device of claim 2 wherein said short rod portion is a bent end portion of said elongate member which extends toward the fishing rod in said first fishing line retaining position.

4. The casting assist device of claim 1 wherein said body has a cut-away area in the vicinity of said weight means with part of said cut-away area being defined by a shoulder on said body means, said shoulder forming a stop for limiting rotational movement of said weight means, and the position of engagement of said weight means with said shoulder forming stop defining said fishing line retaining position.

5. The casting assisting device of claim 1 wherein said body has a portion defining a stop which is engaged by said weight means when said weight means rotates from an upper fishing line retaining position downwardly, the engagement of said weight means with said stop defining said non-fishing line retaining position.

6. The casting assisting device of claim 1 including a sleeve-shaped spacer mounted on said elongate member between said body and said line retaining means for locating said line retaining means at a predetermined position forwardly of said body.

7. The casting assisting device of claim 1 wherein said means for mounting include means for releasably clamping said body to the fishing rod handle.

8. The casting assisting device of claim 1 wherein said weight means include a weight having a passageway therethrough for receiving and being mounted on said proximal end of said elongate member and a transverse passageway having an axis which intersects said axis of said elongate member and a threaded fastener in said transverse passageway and screwthreadingly moveable in said transverse passageway against said proximal end of said elongate member for locking said weight in a desired position on said elongate member relative to the radial position of said line retaining means.

9. A fishing line casting assist device comprising a body releasably mountable on the handle of a fishing rod, a rotatable line retaining member rotatably journaled in said body, movable between a line retaining position and a non-line retaining position and having a weight coupled thereto, extending radially outwardly therefrom, and having sufficient weight for creating a retaining force for maintaining a fishing line trained over said line retaining member when the weight is positioned toward the handle in the line retaining position where the force of gravity on the weight alone, without manual engagement of the weight and without the application of a spring force on the retaining member toward or away from the line retaining position, holds the line in the retained position against any tension in the line due to the weight of a bait or a lure at the distal end of the line until the fishing rod is cast whereupon the forces created during casting causes the retaining member to move to the non-line retaining position where the fishing line is free to flow out of a reel mounted on the fishing rod.

* * * * *